K. MAYBACH

June 24, 1930. TRANSMISSION GEAR Re. 17,707

2 Sheets-Sheet 1

Original Filed March 31, 1928

Inventor:

Karl Maybach

K. MAYBACH

June 24, 1930. TRANSMISSION GEAR Re. 17,707

2 Sheets-Sheet 2

Original Filed March 31, 1928

Inventor:
Karl Maybach

Reissued June 24, 1930

Re. 17,707

UNITED STATES PATENT OFFICE

KARL MAYBACH, OF FRIEDRICHSHAFEN, GERMANY, ASSIGNOR TO MAYBACH-MOTORENBAU GESELLSCHAFT MIT BESCHRANKTER HAFTUNG, OF FRIEDRICHSHAFEN, GERMANY

TRANSMISSION GEAR

Original No. 1,719,188, dated July 2, 1929, Serial No. 266,292, filed March 31, 1928, and in Germany October 5, 1927. Application for reissue filed April 15, 1930. Serial No. 444,587.

My invention relates to transmission gears and especially to two-speed gears in motor vehicles.

Recently there has again arisen a general demand for an over-drive or over-speed in motor cars having three speeds in connection with the average axle ratio of about 5 to 1. Such an over-drive should be practically noiseless and for this purpose internal gears were introduced.

The main object of my invention is an over-drive having spur wheels instead of internal gears. These spur wheels in my gear are constantly in mesh with each other. By using spur wheels it is possible to arrange the teeth inclined and to grind them, which feature contributes considerably to the effect of making the over-drive satisfactory from the standpoint of noiselessness.

Another object of my invention is to provide for a change in speed, between third and fourth speed for example, which can be effected without operating the friction clutch.

A further main object is the provision of a mechanism which may be easily attached to an automobile without necessitating any material change in the construction of the automobile.

According to my invention a special type of supplemental change speed gear is inserted. This gear comprises a direct drive and the so-called over-drive or over-speed.

In certain cases, for example in motor busses, it will be possible to use only the change speed gear according to my invention without having any other gear besides.

In other cases my change speed gear may be reversed so as to slow down the speed of the vehicle as compared with the speed in direct drive. In such cases the direct drive may be the fourth speed and the other speed the third one; this arrangement allowing also for a reduction in the rear axle ratio, for example to 3 to 1, or the like, as circumstances may afford.

Of course my additional two-speed gear may as well be used in connection with a usual shift gear having any number of change speeds as in co-operation with a change speed gear of the planetary type.

All this will be understood best when having reference to the drawings which represent an example embodying my invention.

Figure 1:
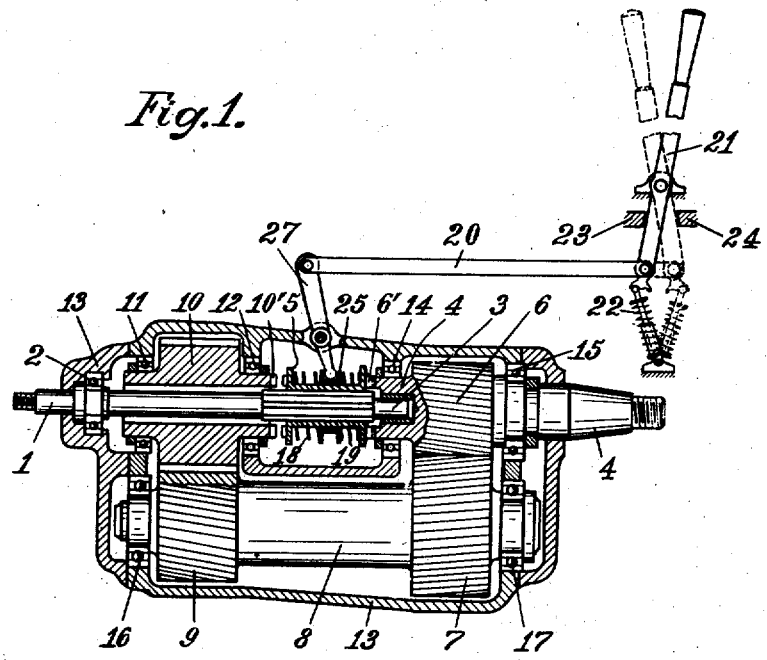
Fig. 1 is a side view on the gear, partly in section.

In my two speed gear shaft 1 is the driving shaft connecting to the motor; shaft 4 is the driven shaft connecting to the rear axle of the car. Shaft 1 is journaled in the casing 13 at 2 and its end shaped into pin 3 is supported within the abutting end of shaft 4. Shaft 1 extends through spur wheel 10, which is journaled in casing 13 by roller bearings 11 and 12. There is no direct connection between shaft 1 and wheel 10, but the latter may freely revolve around shaft 1. Shaft 4 at its end has a spur wheel 6 in solid connection therewith or the end itself may be shaped into a spur wheel. This spur wheel 6 or shaft end is supported in casing 13 by means of roller bearings 14 and 15. There is a shaft 8 arranged substantially parallel to shafts 1 and 4. This shaft is journaled in the casing 13 at 16 and 17, and close to these bearings spur wheels 9 and 7, respectively, are situated and are formed integral with shaft 8. Spur wheel 9 is in constant mesh with spur wheel 10, and spur wheel 7 constantly meshes with spur wheel 6. All the spur wheels have inclined teeth which are ground.

On the end of shaft 1 and situated between wheels 10 and 6 there is mounted a sleeve 5 having at each of its ends one half of a claw coupling, which halves correspond to oppositely situated coupling halves, 10′ and 6′, respectively, belonging to wheels 10 and 6, respectively. Sleeve 5 is splined to shaft 1 so that it revolves together with this shaft and can be shifted on the shaft in its longitudinal direction. It is provided with a loose U-shaped ring 25. There is a lever 27 extending into this ring. This lever and ring are held by springs 18 and 19, and rod 20 operated by lever 21 serves for shifting sleeve 5 so as to engage alternately with wheel 6 or with wheel 10. Spring mechanism 22 makes it impossible for lever 21 and for sleeve 5 to rest in a neutral middle position. When lever 21 is operated spring mechanism 22 will always cause it to rest only when bearing against one of the two stops 23 or 24 so that spring 18 or spring 19 presses the sleeve 5 towards engagement with wheel 6 or with wheel 10, respectively. There is no neutral position for sleeve 5 which is one of the important features in connection with my invention.

Another main feature is the construction of the front faces of the projections or dogs of the claw couplings. These faces are beveled and the inclination of the faces of the right hand coupling is in the same direction as that of the faces of the left hand coupling, as may be seen from Fig. 2, so that the faces of both couplings may be called substantially parallel to each other.

I now want to explain the operation of the gear and the advantages connected therewith:

In the example represented wheel 10 has a larger diameter than wheel 9 and also wheel 7 has a larger diameter than wheel 6. This means that inserting the gear by connecting sleeve 5 to wheel 10 causes an increase in the number of revolutions and in speed from driving shaft 1 as compared to driven shaft 4, whereas engagement of sleeve 5 with wheel 6, which is the same as with shaft 4, makes both shafts revolve at the same speed, causing the so called direct drive.

By choosing the diameters of the wheels in relation to each other the ratio of transmission may be determined in any desired way, as is well known.

Figure 2:
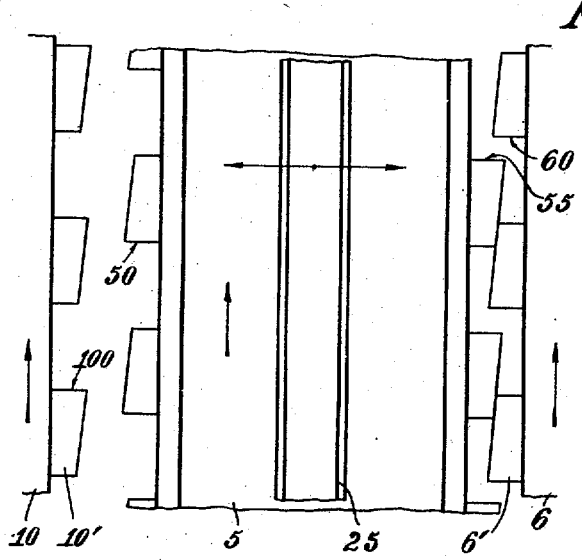
Fig. 2 is a diagram showing the way in which the two claw couplings are constructed for the alternate connection of the driving shaft coming from the motor side with the driven shaft going to the differential gear. It represents a portion of the circumference of sleeve 5 and the adjacent couplings, developed in the drawing plane, and on a larger scale.

Assuming the direct drive had been set which means engagement of sleeve 5 with shaft 4, and now I throw the upper arm of lever 21, bearing at the time against stop 23, to the left so as to bear against stop 24 (lever position in dotted lines). This operation causes lever 27 to compress spring 18 which tends to shift sleeve 5 to the left hand side also; but as long as the motor gets gas the friction between the side faces 55 and 60 of the right hand claw coupling prevents the two halves from coming out of engagement. Now I turn the gas off and immediately the right hand coupling is disconnected and the left hand coupling tends to come into engagement. But as the two halves of the coupling have different speed, sleeve 5 turning faster than wheel 10, the projections or dogs do not engage but rattle past each other and would cause destruction if their front faces were not beveled, as shown in Fig. 2, so that the two halves of the coupling are always thrown away from each other against the pressure exerted by spring 18 as long as sleeve 5 revolves faster than wheel 10.

With the throttle closed, the speed of rotation of shaft 1 and sleeve 5 will slow up quite rapidly, while gear 10 will continue at substantially constant speed due to the momentum of the car. As this change occurs, sleeve 5 and wheel 10 will eventually reach the same speed. If at the instant that the speeds equalize the teeth are properly aligned the clutch will engage; if they are not properly aligned, the speed of sleeve 5 will decrease an additional slight amount, bringing face 100 in contact with face 50, thus aligning the clutch members and permitting them to engage under the tension of spring 18.

When one wishes to return to the direct drive, lever 21 is thrown back against stop 23. This compresses spring 19, but due to the fact that the engine is transmitting power to the driven shaft, the frictional engagement of the clutch prevents the shift from taking place. If the throttle is closed so that power is no longer being transmitted, sleeve 5, acting under the tension of spring 19, will snap over toward gear 6. Gear 6 rotates more rapidly than gear 10, and as sleeve 5 will move almost instantaneously from contact with gear 10 into contact with gear 6, it will be rotating more slowly than gear 6. The faces of the couplings are so pitched that engagement will not take place while sleeve 5 is rotating more slowly than gear 6; thus again the clutch will overrun for a short time without engagement. As soon as the throttle is opened, speeding up the motor, the speed of sleeve 5 will increase until it equals the speed of gear 6. Unless the teeth of gears happen at this moment to be exactly aligned, the clutch members will come into the position shown in Fig. 2. As the speed of sleeve 5 increases it will immediately begin to overrun wheel 6 and a side face 55 will bear against the side face 60 and thereupon the teeth of sleeve 5 will be pressed by spring 19 so as to enter the gaps between the teeth of wheel 6. Thus the engagement of the right hand coupling will be perfected and the gearing will be in direct drive.

The entire operation of the two speed gear is accomplished simply in the above described way, without operating the friction clutch, as is necessary with ordinary change speed gears. This is possible because of the way the projections of the couplings are inclined and because of there being provided means for preventing the sleeve from taking a neutral idling position.

The front faces of the projections in the left hand coupling must be inclined in the same direction as those in the right hand coupling so that the faces may be called substantially parallel to each other. It is not necessary that the front faces of both engageable halves of the couplings are inclined. It suffices if those of one half, or only a limited number thereof, have this inclination. But I prefer to provide all projections with inclined front faces.

My two-speed-gear may be applied in cars without providing any other speed gear, for example in motor busses, which besides may or may not have a possibility of going backwards apart from my speed gear. It will be advisable in such cases to have a separate friction clutch in addition.

Figure 3:
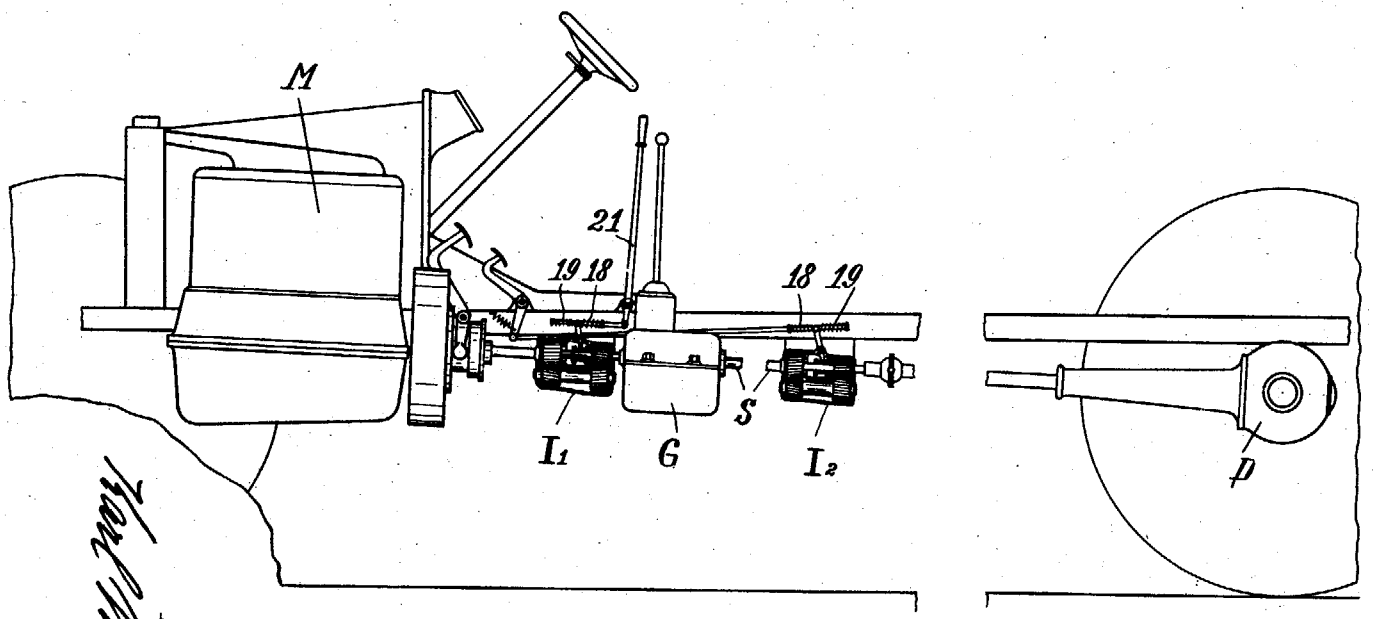
Fig. 3 represents diagrammatically the arrangement in a car having two speed gears according to my invention in addition to a usual change speed gear of the shifting type or of the planetary type, but on a smaller scale.

In cars having the usual change speed gear my two-speed-gear may be inserted between the motor and the ordinary change speed gear, or it may be inserted between this gear and the differential gear, or even two gears according to my invention may be provided one between motor and ordinary change speed gear and the second one between this gear and the differential gear. This arrangement is shown diagrammatically in Fig. 3. At the left hand side the motor M is to be seen. Next follows the first one of my gears $I_1$, then the usual change speed gear G, on the driving shaft S the second one of my gears $I_2$ is provided, to which follows the differential gear D.

Of course the construction of my gear has to be very compact and strong, so as to avoid every unevenness in running and have a minimum of shocks and of vibration. This I attain according to my invention by journaling the spur wheels on the driving and on the driven shafts on both sides of the wheels and by providing a thick stub shaft. Besides I prefer to have inclined teeth on all four spur wheels, for the same purpose, and also to arrange the stub shaft 8 as close as possible to the axis of the driving and driven shafts 1 and 4.

It is best to have the gear mechanism surrounded by a casing 13 which should be filled with oil, fat or the like, so that an easy and quiet running is attained.

As explained at the beginning I think the main advantage of my invention will be made in cars having a usual change speed gear to which my two-speed-gear is added. This causes a double number of possible speeds, but the main thing is when the highest speed of the ordinary change speed gear is on my two speed gear now allows for a further change in speed without operating the friction clutch, simply by setting the lever, taking the gas off for a moment and then giving gas again.

My two speed gear may be provided in a car from the beginning of its construction or it may be mounted in addition into any car.

There are many possibilities of making use of my invention without sticking to the details described or shown in the drawings. Thus I do not want to be limited to these details.

What I claim is:

1. In a transmission mechanism of the type comprising a first rotatable member, a second rotatable member substantially aligned with said first member, means whereby said second member is rotated at higher speed than the first member but in the same direction and in constant speed ratio with the first member and a slidable sleeve between said members substantially concentric with the axis of said members but adapted to be rotated independently thereof; clutch mechanism whereby said sleeve may be connected with either of said members, means whereby said sleeve is at all times tensioned toward one or the other of said members, means forming part of said clutch mechanism whereby when said sleeve leaves the more rapidly rotating member and moves to engage with the more slowly rotating member, said clutch mechanism will over-run and not engage so long as said sleeve is rotating more rapidly than such member, and similar means forming part of said clutch mechanism whereby when said sleeve leaves the more slowly rotating member and moves to engage with the more rapidly rotating member, said clutch mechanism will over-run and not engage so long as such member is rotating more rapidly than the sleeve.

2. In a two-speed gear mechanism of the type comprising a shaft, a gear concentric therewith but rotatable independent thereof, a second shaft substantially aligned with the first shaft and having fixed to it a gear of different size from said first gear, a sleeve between said gears movable longitudinally between them but fixed to rotate with said first shaft and a stub shaft provided with gears to mesh with said first two gears to cause them to rotate at different speeds; a claw coupling for connecting said sleeve with the larger of said first two gears, having teeth with faces so pitched that said coupling will over-run and not engage when said sleeve is rotating faster than said gear and a second claw coupling for connecting said sleeve with the smaller of said first two gears having teeth with faces so pitched that said coupling will over-run and not engage when said gear is rotating faster than said sleeve.

3. A structure as specified in claim 2, which further includes mechanism for tensioning said sleeve towards either of said gears under tension insufficient to break the engagement between said sleeve and the other of said gears when any substantial amount of power is being transmitted between said shafts, whereby said sleeve may be tensioned to move longitudinally and later caused so to move by reducing the power that is being transmitted between said shafts.

4. A structure as specified in claim 2 which further includes mechanism for tensioning said sleeve towards either of said gears and means for preventing said mechanism from holding said sleeve in neutral position.

5. In a motor vehicle in combination a motor; a rear axle gear; and a two-speed gear, said two-speed gear comprising a driving shaft and a driven shaft substantially in alignment with and abutting each other, an exceptionally sturdy stub shaft situated substantially parallel to and closely to said first two shafts, a broad spur wheel loosely mounted on said driving shaft, a broad spur wheel rigidly fixed on said stub shaft, said two spur wheels being in constant mesh with each other, a broad spur wheel rigidly fixed on said driven shaft, a second broad spur wheel rigidly fixed on said stub shaft, said latter two spur wheels being in constant mesh with each other, all said four spur wheels having inclined and ground teeth, a sleeve splined to the end of said driving shaft, said sleeve having half a claw coupling at one end and half a claw coupling at its other end, said first spur wheel having half a claw coupling on its side facing said sleeve adapted to engage with said half claw coupling on said first sleeve end and forming a coupling therewith, said spur wheel on said driven shaft having half a claw coupling on its side facing said sleeve adapted to engage with said half claw coupling on said second sleeve end and forming a coupling therewith, said first claw coupling having projections with inclined front faces and said second coupling also having projections with inclined front faces, all said inclined front faces being inclined in the same direction; a casing surrounding said two-speed gear; two bearings in said casing for closely journaling said first spur wheel, two bearings in said casing for closely journaling said spur wheel on said driven shaft, and two bearings in said casing for journaling said stub shaft at its ends and closely to said two spur wheels thereon; and an operating mechanism for said sleeve, said mechanism comprising an operating lever having two rest positions only, a spring adapted to be compressed by means of said lever in one of said rest positions thereof and thereby pressing said sleeve against said first spur wheel, and a spring adapted to be compressed by means of said lever in the other one of said rest positions thereof and thereby pressing said sleeve against said spur wheel fixed on said driven shaft.

6. A change speed gearing including a shaft, a pair of concentric gears of different pitch diameters coaxial therewith and each relatively rotatable in respect to the shaft, means operatively connecting said gears to effect simultaneous rotation at different speeds and in fixed speed ratio, a sleeve between said gears slidable on said shaft but fixed against relative rotation in respect thereto, a claw coupling for connecting said sleeve with the larger of said gears, having teeth with faces so inclined that said coupling will overrun and not engage when said shaft and sleeve are rotating faster than said gear, and a second claw coupling for connecting said shaft and sleeve with the smaller of said gears, having teeth with faces so inclined that said coupling will overrun and not engage when said gear is rotating faster than said shaft and sleeve.

7. A change speed gearing including a shaft, a pair of gears of different diameters coaxial therewith and rotatable in respect thereto, a countershaft having a pair of gears meshing with said first mentioned gears whereby said first mentioned gears are simultaneously rotatable at different speeds but in fixed speed ratio, a sleeve between said first gears movable longitudinally between them but fixed to rotate with said shaft, a claw coupling for connecting said sleeve with the larger of said first two gears and having teeth with end faces so pitched that said coupling will overrun and not engage when said sleeve is rotating faster than said gear, and a second claw coupling connecting said sleeve with the smaller of said first two gears and having teeth with faces so pitched that said coupling will overrun and not engage when said gear is rotating faster than said sleeve.

8. A change speed gearing including a shaft, a pair of gears of different diameters coaxial therewith and rotatable in respect thereto, a countershaft having a pair of gears meshing with said first mentioned gears whereby said first mentioned gears are simultaneously rotatable at different speeds but in fixed speed ratio, a sleeve between said first gears movable longitudinally between them but fixed to rotate with said shaft, a pair of claw couplings for connecting said sleeve with either of said first gears to connect the coupled gear to said shaft, the end faces of the teeth of both of said claw couplings being inclined in the same direction and in such direction in respect to the normal direction of rotation of said shaft that the coupling connecting said sleeve and the larger of said first gears will overrun and not engage when said sleeve is rotating faster than said gear and that the coupling connecting said sleeve and the smaller of said first gears will overrun and not engage when said gear is rotating faster than said sleeve.

9. A change speed gearing including a shaft, a pair of concentric gears of different pitch diameters coaxial therewith and each relatively rotatable in respect to the shaft, means operatively connecting said gears to effect simultaneous rotation at different speeds and in fixed ratio, a sleeve between said gears slidable on said shaft but fixed against rotation in respect thereto, a pair of claw couplings for connecting said sleeve with either of said gears to connect the coupled gear to said shaft, the end faces of the teeth of both of said claw couplings being inclined in the same direction and in such direction in respect to the normal direction of rotation of said shaft that the coupling connecting said sleeve and the larger of said gears will overrun and not engage when said sleeve is rotating faster than said gear and that the coupling connecting said sleeve and the smaller of said gears will overrun and not engage when said gear is rotating faster than said sleeve.

10. A change speed gearing including a pair of concentric gears of different pitch diameters, means operatively connecting said gears to effect simultaneous rotation at different speeds and in fixed speed ratio, a sleeve between said gears, a claw coupling for connecting said sleeve with the larger of said gears, having teeth with faces so inclined that said coupling will overrun and not engage when said sleeve is rotating faster than said gear, and a second claw coupling for connecting said sleeve with the smaller of said gears, having teeth with faces so inclined that said coupling will overrun and not engage when said gear is rotating faster than said sleeve.

KARL MAYBACH.